United States Patent [19]

Uemura et al.

[11] Patent Number: 5,108,494
[45] Date of Patent: Apr. 28, 1992

[54] ZINC ALLOY POWDER FOR ALKALINE CELL AND METHOD FOR PRODUCTION OF THE SAME

[75] Inventors: Toyohide Uemura; Tomotaka Motomura, both of Takehara; Junichi Asaoka; Shuji Tsuchida, both of Kadoma; Tomiko Yamaguchi, Takehara, all of Japan

[73] Assignees: Mitsui Mining & Smelting Co., Ltd., Muromachi; Matsushita Electric Industrial Co., Ltd., Kadoma, both of Japan

[21] Appl. No.: 701,215

[22] Filed: May 16, 1991

[30] Foreign Application Priority Data

Feb. 19, 1991 [JP] Japan .................................. 3-45332
Feb. 19, 1991 [JP] Japan .................................. 3-45333

[51] Int. Cl.$^5$ ...................... B22F 9/08; C22C 18/00; H01M 4/42
[52] U.S. Cl. .................................. 75/347; 75/352; 429/229; 429/206; 420/513; 420/514; 420/518; 420/520
[58] Field of Search ..................... 429/229, 219, 206; 75/347, 355

[56] References Cited
FOREIGN PATENT DOCUMENTS 0077259 4/1986 Japan .
3006749 1/1988 Japan .
0213051 8/1990 Japan .

Primary Examiner—R. Dean
Assistant Examiner—Sikyin Ip
Attorney, Agent, or Firm—Bucknam and Archer

[57] ABSTRACT

A non-amalgamated zinc alloy powder for use in an alkaline cell which comprises 1 ppm or less of iron and an elemental component selected from among the following combinations (1) to (5):

(1) 0.01 to 0.5% by weight of bismuth, 0.01 to 0.5% by weight of indium and 0.01 to 0.5% by weight of lead,
(2) 0.01 to 0.5% by weight of bismuth, 0.01 to 0.5% by weight of indium and 0.01 to 0.5% by weight of calcium,
(3) 0.01 to 0.5% by weight of lead and 0 to 1.0% by weight in total of at least one member selected from among bismuth, aluminum and calcium,
(4) 0.01 to 0.5% by weight of calcium, 0.01 to 0.5% by weight of bismuth and 0 to 0.5% by weight of aluminum, and
(5) 0.01 to 0.5% by weight of lead, 0.01 to 0.5% by weight of indium, 0.01 to 0.5% by weight of calcium and 0 to 0.5% by weight of aluminum, and which can greatly suppress the evolution of hydrogen gas and maintain the discharge performance on a practical level, and a method for the production of the same.

13 Claims, 2 Drawing Sheets

5,108,494

ZINC ALLOY POWDER FOR ALKALINE CELL AND METHOD FOR PRODUCTION OF THE SAME

BACKGROUND OF THE INVENTION

1. Field of the Invention

The present invention relates to a zinc alloy powder for use in an alkaline cell and a method for the production of the same. More particularly, the present invention is concerned with a non-amalgamated zinc alloy powder for use in an alkaline cell, which has an iron content of 1 ppm or less and contains specific elements added so as to suppress the evolution of hydrogen gas and to improve the leaktightness of a cell, and a method for the production of the same.

2. Prior Art

The mercury contained in an amalgamated zinc powder used as an anode active material in an alkaline cell has been known to be an essential component for such an active material from the viewpoint of suppressing the evolution of hydrogen gas due to the corrosion of zinc and preventing a liquid from leaking from the cell as a result of the evolution of hydrogen gas.

In light of environmental protection, however, a reduction in the mercury content is required in this field. In line with this requirement, it has become possible to suppress the evolution of hydrogen gas through the addition of not only lead but also aluminum, bismuth, indium and the like as additional elements to zinc so that the mercury content is remarkably reduced from 10% by weight to about 1% by weight.

As further social needs, in recent years, it is required to decrease the mercury content of the anode active material to 0% by weight, in other words, to effect non-amalgamation. This non-amalgamation greatly changes the situation, and it has been difficult to decrease the evolution of hydrogen gas to a desired level even when the above-described additional elements are added. That is, although zinc alloy powders as an anode active material having various types of elements added thereto have been proposed (see, for example, Japanese Patent Laid-Open Nos. 22984/1990 and 153950/1986), it has been impossible to attain the desired suppression of hydrogen gas evolution when the mercury content is 0% by weight, though such suppression has been possible even when the mercury content is 1% by weight or less.

Meanwhile, attempts have been made to suppress the evolution of hydrogen gas and to improve the discharge performance by reducing the impurity content of zinc. For example, Japanese Patent Laid-Open No. 123653/1987 describes a reduction in the content of impurities such as iron and chromium. Table 1 on page 4 of the published specification shows that an improvement in the discharge performance while suppressing the evolution of hydrogen gas is attained by reducing the iron content to about 10 ppm in an anode active material which comprises an amalgamated zinc alloy powder containing predetermined amounts of lead, indium and aluminum and containing 1% by weight of mercury.

However, a zinc alloy powder having a mercury content of 0% by weight could not attain the desired effect of suppressing the evolution of hydrogen gas even when the impurity content was reduced to about 10 ppm and additional elements such as lead were incorporated.

Thus the non-amalgamation of an anode active material is accompanied by a difficulty which is fundamentally different from that encountered in the low amalgamation leading to a mercury content of 0.6 to 1% by weight, and there has not been developed any alkaline cell wherein a non-amalgamated zinc alloy powder is used as an anode active material, the evolution of hydrogen gas is suppressed, and the leaktightness is improved.

SUMMARY OF THE INVENTION

The present invention has been made to solve the above-described problems of the prior art. It is an object of the present invention to provide a zinc alloy powder for use in an alkaline cell which substantially suppresses the evolution of hydrogen gas and maintains the discharge performance on a practical level in non-amalgamated cells and a method for the production of the same. The final object of the present invention is to improve the leaktightness of a mercury-free alkaline cell.

The present inventors have made intensive studies in line with the above-described objects. As a result, they have found that the objects can be attained by the synergistic effect of the use of zinc having an extremely low content of iron as an impurity and the addition of specific elements thereto, thus accomplishing the present invention.

That is, the zinc alloy powder for use in an alkaline cell according to the present invention comprises 1 ppm or less of iron and elements selected from among the following combinations (1) to (5):

(1) 0.01 to 0.5% by weight of bismuth, 0.01 to 0.5% by weight of indium and 0.01 to 0.5% by weight of lead,
(2) 0.01 to 0.5% by weight of bismuth, 0.01 to 0.5% by weight of indium and 0.01 to 0.5% by weight of calcium,
(3) 0.01 to 0.5% by weight of lead and 0 to 1.0% by weight in total of at least one member selected from among bismuth, aluminum and calcium,
(4) 0.01 to 0.5% by weight of calcium, 0.01 to 0.5% by weight of bismuth and 0 to 0.5% by weight of aluminum, and
(5) 0.01 to 0.5% by weight of lead, 0.01 to 0.5% by weight of indium, 0.01 to 0.5% by weight of calcium and 0 to 0.5% by weight of aluminum.

DETAILED DESCRIPTION OF THE PREFERRED EMBODIMENTS

In the present invention, it is a requisite that the iron content be 1 ppm or less. When it exceeds 1 ppm, the effect of suppressing the evolution of hydrogen gas is lowered. The expression "the iron content is 1 ppm or less" used herein means that the iron content is not greater than the limiting analytic value as measured by the conventional analytical methods, such as ICP or atomic absorption spectrometry, without separating iron from zinc. No attempt has hitherto been made to use a zinc or zinc alloy powder having such a low iron content as an anode active material, nor there has been any report describing such use. A high-purity metallic zinc can be prepared for use in special applications such as a semiconductor by special methods such as zone melting. Such a metallic zinc is so expensive that it cannot be used as the raw material of dry cells. Also there is no example wherein such a metallic zinc has been used as an alloy powder. In rectified zinc which is regarded as having the highest purity out of the zinc ingots obtained by industrial mass production, the iron content prescribed in Japanese Industrial Standards is 20 ppm or less. Among the varieties of the rectified zinc, even the one having a particularly low impurity level generally has an iron content of 2 ppm or greater. Further, the iron content of electrolytic zinc is on the same level.

In the present invention, the zinc alloy contains an element component selected from among the above combinations (1) to (5). When the content of each component element falls outside the above-described range, there occur problems such as the failure to attain the desired effect of suppressing the evolution of hydrogen gas or the failure to maintain a practical discharge performance. If elements other than the above-described combinations are added, for example, if aluminum, bismuth, calcium or the like, generally incorporated in a zinc alloy powder used as an anode active material, is are, the above-described effects of the present invention cannot be attained.

The production method of the present invention will now be described.

In the present invention, a zinc having an iron content of 1 ppm or less is used. Examples of the zinc having such a low iron content include a deposited zinc obtained by electrolysis and a zinc ingot prepared from zinc obtained by distillation. A zinc ingot prepared by melting deposited zinc together with a flux, such as ammonium chloride, and casting the melt into a mold has hitherto been used as a starting zinc material of an anode active material. In such zinc ingot, it is impossible to decrease the iron content to 1 ppm or less. This is because, in general, zinc is contaminated with iron originating in a separator in the step of removing dross formed on the surface of molten zinc and returning partially recovered zinc to the melt. Further, the contamination with iron may occur from a melt pump, a mold or an atmosphere.

Elements listed in the combinations (1) to (5) described above are dissolved in the melt of a zinc having a low iron content so as to be within predetermined ranges of contents. Then, pulverization is performed by atomization, followed by sifting, to thereby give a zinc alloy powder. It is preferred from the viewpoint of further improving the suppressing effect of hydrogen gas evolution to limit the iron content of the atmosphere for each of the melting and atomization steps to 0.009 mg/m$^3$ or less. From the same viewpoint, it is also preferred to magnetically separate the obtained zinc alloy powder.

The iron content of the resultant zinc alloy powder is 1 ppm or less as described above. This powder can suppress the evolution of hydrogen gas to about 300 μl/daycell (type LR6), which is an allowable upper limit of leaktightness, or less.

Regarding the mechanism of the evolution of hydrogen gas due to the corrosion of zinc, only macroscopic gas quantity measurements and presumption-based crystal structure relationship have hitherto been discussed, and there has been no study made as far as gas evolution sites. The present inventors have found that the sites of continuous gas evolution are those where trace amounts of iron, stainless steel and iron oxide are mixed together and localized.

In the present invention, therefore, the iron content is minimized and predetermined amounts of specific elements are added, whereby a synergistic effect works to suppress the evolution of hydrogen gas.

As described above, a zinc alloy powder for use in an alkaline cell and having an iron content of 1 ppm or less is produced by melting a zinc having and iron content of 1 ppm or less together with specific elements to give a melt and directly atomizing the melt.

Although this zinc alloy powder is non-amalgamated, it can greatly suppress the evolution of hydrogen gas and maintain the discharge performance on a practical level when it is used as an anode active material of an alkaline cell. Further, since no mercury is contained, the alkaline cell comprising this zinc alloy powder as an anode active material satisfies social needs.

PREFERRED EMBODIMENTS OF THE PRESENT INVENTION

The present invention will now be described in more detail with reference to the following Examples and Comparative Examples.

EXAMPLES 1 TO 33 AND COMPARATIVE EXAMPLES 1 TO 7

A melt of zinc alloy was prepared by melting an electrolytically deposited zinc having an iron content of 1 ppm or less at about 500° C. and adding thereto predetermined amounts of elements listed in Table 1 in an atmosphere having an iron content of 0.005 mg/m$^3$ in a room. No element was added in Comparative Example 1.

The melt was directly powdered using high-pressure argon gas (ejection pressure: 5 kg/cm$^2$) in the same atmosphere to give zinc alloy powders, which were sifted to give 50- to 150-mesh powders.

Using a magnet, magnetic separation was performed to thereby remove free iron powder. All of the obtained zinc alloy powders had an iron content of 1 ppm or less.

An electrolyte was prepared by adding about 1.0% of carboxymethylcellulose and polysodium acrylate as a gelating agent to a 40% aqueous potassium hydroxide solution saturated with zinc oxide.

3.0 g of the above-described zinc alloy powder as an anode active material was mixed with 1.5 g of the electrolyte to thereby give a gel. Using the gel as an anode material, the alkaline manganese cell as shown in FIG. 1 was produced.

This alkaline manganese cell was partially discharged by 25%, and the rate of hydrogen gas evolution due to the corrosion of the zinc alloy powder was measured. The results are given in Table 1. the reason for performing the 25% partial discharge is that the rate of hydrogen gas evolution is maximized around 25% partial discharge supposing that the time necessary for discharge to 0.9 V is 100% for a separately prepared non-mercury alkaline manganese cell. It was supposed that discharge conditions of 1Ω and 11 minutes represent 25% partial discharge.

Figure 1:
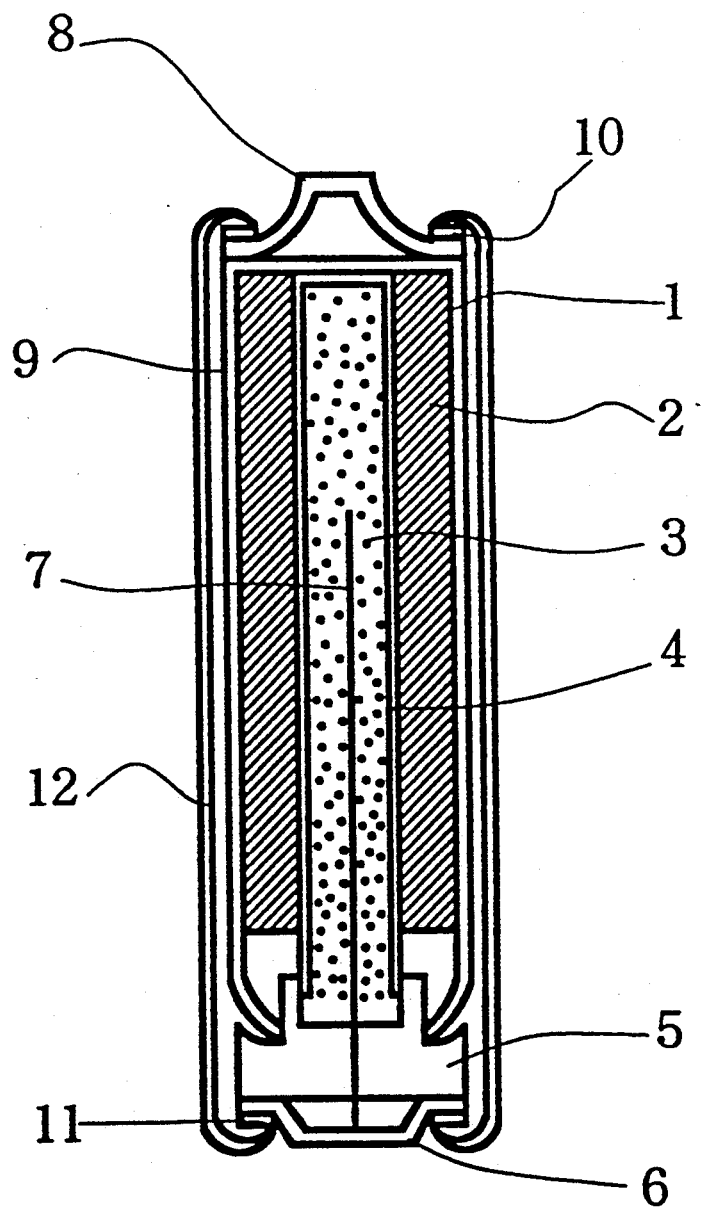
FIG. 1 is a cross-sectional side view of an alkaline manganese cell according to the present invention.

The alkaline manganese cell of FIG. 1 is composed of cathode can 1, cathode 2, anode (gelled zinc alloy powder) 3, separator 4, opening sealant 5, anode bottom plate 6, anode electricity collector 7, cap 8, heat-shrinkable resin tube 9, insulating rings 10 and 11 and exterior can 12.

COMPARATIVE EXAMPLES 8 TO 29

A zinc ingot, as a starting material, prepared by casting according to the conventional procedure an electrolytically deposited zinc having an iron content of 1 ppm or less, was melted at about 500° C. in an atmosphere having an iron content of 5 mg/m$^3$. Added to the melt were predetermined amounts of elements listed in Table 1 to give zinc alloy melts.

Each of the melts directly powdered using a high-pressure argon (ejection pressure: 5 k/cm$^2$) in the same atmosphere to give zinc alloy powders, which were sifted to give 50- to 150-mesh powders.

All of the obtained zinc alloy powders had an iron content of 3 ppm. No magnetic selection was performed.

Using each of the zinc alloy powders, an alkaline cell as shown in FIG. 1 was produced in substantially the same manner as that of Example 1 and 25% partial discharge was performed to measure the rate of hydrogen gas evolution. The results are given in Table 1.

TABLE 1

| Ex. No. | Pb | Al | Bi | Ca | In | Fe | Gas evolution rate μl/cell · day |
|---|---|---|---|---|---|---|---|
| Ex. 1 | 0.05 | | 0.01 | | 0.05 | ≦1 | 182 |
| Ex. 2 | 0.05 | | 0.05 | | 0.05 | ≦1 | 230 |
| Ex. 3 | 0.05 | | 0.5 | | 0.05 | ≦1 | 245 |
| Ex. 4 | 0.05 | | 0.05 | | 0.01 | ≦1 | 237 |
| Ex. 5 | 0.05 | | 0.05 | | 0.5 | ≦1 | 211 |
| Ex. 6 | 0.01 | | 0.05 | | 0.05 | ≦1 | 195 |
| Ex. 7 | 0.5 | | 0.05 | | 0.05 | ≦1 | 193 |
| Ex. 8 | | | 0.05 | 0.01 | 0.05 | ≦1 | 107 |
| Ex. 9 | | | 0.05 | 0.05 | 0.05 | ≦1 | 108 |
| Ex. 10 | | | 0.05 | 0.5 | 0.05 | ≦1 | 135 |
| Ex. 11 | 0.01 | | | | | ≦1 | 115 |
| Ex. 12 | 0.05 | | | | | ≦1 | 102 |
| Ex. 13 | 0.5 | | | | | ≦1 | 98 |
| Ex. 14 | 0.05 | 0.01 | | | | ≦1 | 91 |
| Ex. 15 | 0.05 | 0.05 | | | | ≦1 | 87 |
| Ex. 16 | 0.05 | 0.5 | | | | ≦1 | 124 |
| Ex. 17 | 0.05 | | 0.01 | | | ≦1 | 163 |
| Ex. 18 | 0.05 | | 0.05 | | | ≦1 | 180 |
| Ex. 19 | 0.05 | | 0.5 | | | ≦1 | 205 |
| Ex. 20 | 0.05 | | | 0.01 | | ≦1 | 117 |
| Ex. 21 | 0.05 | | | 0.05 | | ≦1 | 122 |
| Ex. 22 | 0.05 | | | 0.5 | | ≦1 | 135 |
| Ex. 23 | 0.05 | 0.05 | 0.05 | | | ≦1 | 105 |
| Ex. 24 | 0.05 | 0.05 | | 0.05 | | ≦1 | 118 |
| Ex. 25 | 0.05 | | 0.05 | 0.05 | | ≦1 | 113 |
| Ex. 26 | | | 0.01 | 0.05 | | ≦1 | 196 |
| Ex. 27 | | | 0.05 | 0.05 | | ≦1 | 208 |
| Ex. 28 | | | 0.5 | 0.05 | | ≦1 | 227 |
| Ex. 29 | | 0.05 | 0.05 | 0.05 | | ≦1 | 201 |
| Ex. 30 | 0.05 | | | 0.1 | 0.05 | ≦1 | 101 |
| Ex. 31 | 0.05 | | | 0.05 | 0.05 | ≦1 | 103 |
| Ex. 32 | 0.05 | | | 0.5 | 0.05 | ≦1 | 115 |
| Ex. 33 | 0.05 | 0.05 | | 0.05 | 0.05 | ≦1 | 95 |
| Comp. Ex. 1 | | | | | | ≦1 | 1728 |
| Comp. Ex. 2 | | | 0.05 | | | ≦1 | 750 |
| Comp. Ex. 3 | | 0.05 | | | | ≦1 | 581 |
| Comp. Ex. 4 | | | | 0.05 | | ≦1 | 767 |
| Comp. Ex. 5 | 0.05 | | | | 0.05 | ≦1 | 768 |
| Comp. Ex. 6 | | | 0.05 | 0.05 | | ≦1 | 529 |
| Comp. Ex. 7 | | | | 0.05 | 0.05 | ≦1 | 472 |

TABLE 1-continued

| Ex. No. | Pb | Al | Bi | Ca | In | Fe | Gas evolution rate μl/cell · day |
|---|---|---|---|---|---|---|---|
| Comp. Ex. 8 | | | 0.05 | | | 3 | 1850 |
| Comp. Ex. 9 | | | 0.05 | | | 3 | 2250 |
| Comp. Ex. 10 | 0.05 | | 0.01 | | 0.05 | 3 | 648 |
| Comp. Ex. 11 | 0.05 | | 0.05 | | 0.05 | 3 | 670 |
| Comp. Ex. 12 | 0.05 | | 0.5 | | 0.05 | 3 | 725 |
| Comp. Ex. 13 | | | 0.05 | 0.01 | 0.05 | 3 | 635 |
| Comp. Ex. 14 | | | 0.05 | 0.05 | 0.05 | 3 | 550 |
| Comp. Ex. 15 | 0.01 | | | | | 3 | 495 |
| Comp. Ex. 16 | 0.05 | | | | | 3 | 481 |
| Comp. Ex. 17 | 0.5 | | | | | 3 | 474 |
| Comp. Ex. 18 | 0.05 | 0.05 | | | | 3 | 503 |
| Comp. Ex. 19 | 0.05 | | 0.05 | | | 3 | 501 |
| Comp. Ex. 20 | 0.05 | | | 0.05 | | 3 | 515 |
| Comp. Ex. 21 | 0.05 | 0.05 | 0.05 | | | 3 | 514 |
| Comp. Ex. 22 | 0.05 | 0.05 | | 0.05 | | 3 | 517 |
| Comp. Ex. 23 | 0.05 | | 0.05 | 0.05 | | 3 | 492 |
| Comp. Ex. 24 | | | 0.05 | 0.05 | | 3 | 524 |
| Comp. Ex. 25 | | 0.05 | 0.05 | 0.05 | | 3 | 531 |
| Comp. Ex. 26 | 0.05 | 0.05 | 0.05 | | | 3 | 477 |
| Comp. Ex. 27 | 0.05 | 0.05 | | | 0.05 | 3 | 488 |
| Comp. Ex. 28 | 0.05 | | | 0.05 | 0.05 | 3 | 473 |
| Comp. Ex. 29 | 0.05 | 0.05 | | 0.05 | 0.05 | 3 | 468 |

Note: *1: ppm only in the case of Fe

As shown in Table 1, in all of the zinc alloy powders of Examples 1 to 33 having an iron content of 1 ppm or less and a specific composition, the rate of hydrogen gas evolution is smaller than about 300 μl/day-cell (type LR6) which is an allowable upper limit of leaktightness. By contrast, in the zinc alloy powders of Comparative Examples 1 to 7, the composition falls outside the scope of the present invention and hence, although the iron content is 1 ppm or less, no effect of suppressing the evolution of hydrogen gas is recognized. Moreover, in the zinc alloy powders of comparative examples 8 to 29, the iron content is 3 ppm and hence, irrespective of whether or not the composition falls within the scope of the present invention, no effect of suppressing the evolution of hydrogen gas is recognized.

EXAMPLES 34 to 37

A zinc alloy powder (Example 34) was produced according to the same composition and conditions as those of Example 12, except that no magnetic separation was performed. A zinc alloy powder (Example 35) was produced according to the same composition and conditions as those of Example 12, except that the melting and the atomization were conducted in an atmosphere of 5 mg/m$^3$.

Similarly, a zinc alloy powder (Example 36) was produced according to the same composition and conditions as those of Example 27, except that no magnetic separation was performed. Further, a zinc alloy powder (Example 37) was produced according to the same composition and conditions as those of Example 27, except that the melting and the atomization were conducted in an atmosphere of 5 mg/m$^3$.

All of the zinc alloy powders thus obtained had an iron content of 1 ppm or less. Using each of the zinc alloy powders, an alkaline cell shown in FIG. 1 was produced in substantially the same manner as that of Example 1 and 25% partial discharge was performed to measure the rate of hydrogen gas evolution. The results are given in Table 2.

TABLE 2

| Ex. No. | Gas evolution rate μl/cell · day |
|---------|----------------------------------|
| Ex. 34  | 102                              |
| Ex. 35  | 102                              |
| Ex. 36  | 208                              |
| Ex. 37  | 208                              |

As is apparent from Table 2, substantially the same results as those of example 12 were obtained in examples 34 and 35, and substantially the same results as those of Example 27 were obtained in Examples 36 to 37.

EXPERIMENT

Zinc alloy powders of Example 2 and comparative Example 11 were amalgamated so as to have a mercury content of 1 and 10% by weight, respectively, thereby producing amalgamated zinc alloy powders.

Using each of the amalgamated zinc alloy powders, an alkaline cell shown in FIG. 1 was produced in substantially the same manner as that of Example 1 and 25% partial discharge was conducted to measure the rate of hydrogen gas evolution. The results were plotted together with the values of Example 2 and Comparative Example 11 as shown in FIG. 2.

Figure 2:
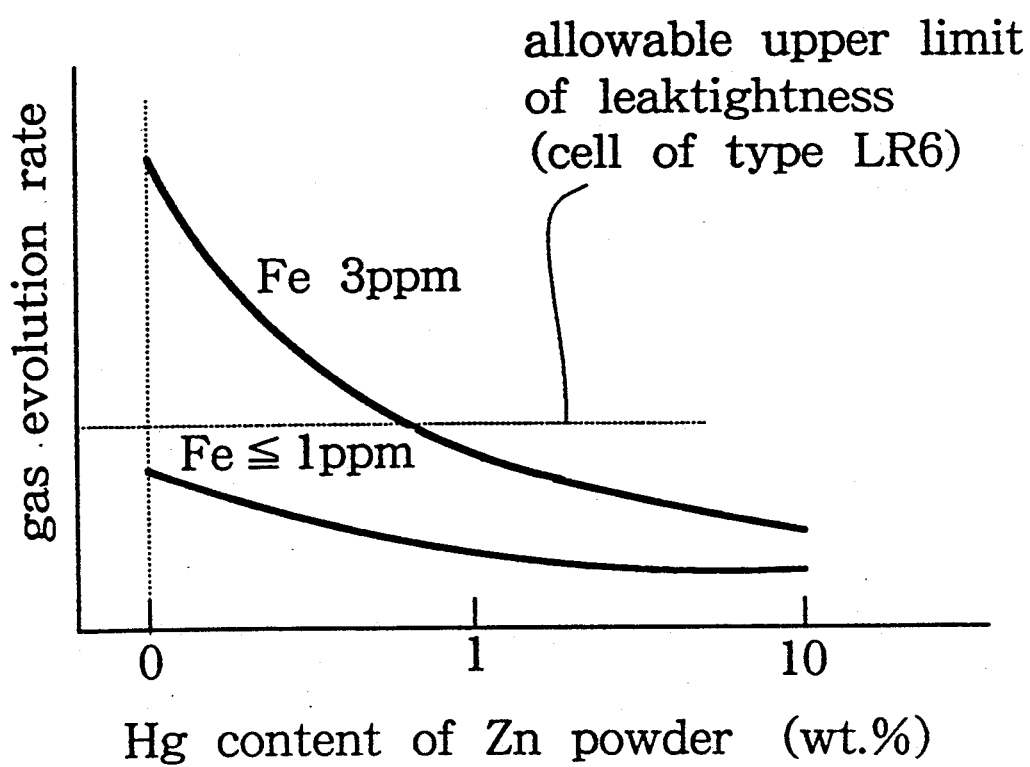
FIG. 2 is a graph showing the relationship between the mercury content of a zinc alloy powder and the rate of hydrogen gas evolution.

As indicated in FIG. 2., when the iron content is 3 ppm, the evolution of hydrogen gas is below the allowable upper limit of leaktightness at a mercury content of 1% by weight or greater. By contrast, when the iron content is 1 ppm or less, the evolution of hydrogen gas is below the allowable upper limit of leaktightness irrespective of the presence or absence of mercury.

A similar test was conducted on the zinc alloy powders of Example 12 and Comparative Example 16 to give substantially the same results.

What is claimed is:

1. A method to produce a non-amalgamated zinc alloy powder for use in an alkaline cell, having an iron content of not more than 1 ppm, which consists of melting an electrolytic deposit zinc obtained by electrolysis and containing iron in an amount of not more than 1 ppm, together with elements in one of the following B compositions (1) to (5):
   (1) 0.01 to 0.5% by weight of bismuth, 0.01 to 0.5% by weight of indium and 0.01 to 0.5% by weight of lead,
   (2) 0.01 to 0.5% by weight of bismuth, 0.01 to 0.5% by weight of indium and 0.01 to 0.5% by weight of calcium,
   (3) 0.01 to 0.5% by weight of lead, and 0 to 1.0% by weight in total of at least one member selected from the group consisting of bismuth, aluminum and calcium,
   (4) 0.01 to 0.5% by weight of calcium, 0.01 to 0.5% by weight of bismuth and 0 to 0.5% by weight of aluminum, and
   (5) 0.01 to 0.5% by weight of lead, 0.01 to 0.5% by weight of indium, 0.01 to 0.5% by weight of calcium and 0 to 0.5% by weight of aluminum, and directly atomizing the formed melt.

2. A non-amalgamated zinc alloy powder for use in an alkaline cell which consists of 0.01 to 0.5% by weight of bismuth, 0.01 to 0.5% by weight of indium, 0.01 to 0.5% of lead, the balance being zinc and containing 1 ppm or less of iron.

3. A non-amalgamated zinc alloy powder for use in an alkaline cell which consists of 0.01 to 0.5% by weight of bismuth, 0.01 to 0.5% by weight of indium, 0.01 to 0.5% by weight of calcium, the balance being zinc and containing 1 ppm or less of iron.

4. A non-amalgamated zinc alloy powder for use in an alkaline cell, which consists of 0.01 to 0.5% by weight of lead, 0 to 1.0% by weight in total of at least one member selected from the group-consisting of bismuth, aluminum and calcium, the balance being zinc and containing 1 ppm or less of iron.

5. A non-amalgamated zinc alloy powder for use in an alkaline cell, which consists of 0.01 to 0.5% by weight of calcium, 0.01 to 0.5% by weight of bismuth, 0 to 0.5% by weight of aluminum, the balance being zinc and containing 1 ppm or less of iron.

6. A non-amalgamated zinc alloy powder for use in an alkaline cell, which consists of 0.01 to 0.5% by weight of lead, 0.01 to 0.5% by weight of indium, 0.01 to 0.5% by weight of calcium, 0 to 0.05% by weight of aluminum, the balance being zinc and containing 1 ppm or less of iron.

7. The method for the production of a zinc alloy powder for use in an alkaline cell according to claim 1, wherein the melting and the atomization are conducted in an atmosphere having an iron content of 0.009 mg/m$^3$ or less.

8. The method for the production of a zinc alloy powder for use in an alkaline cell according to claim 1, wherein the atomized powder is magnetically separated.

9. An alkaline cell comprising the zinc alloy powder according to claim 2 as an anode active material.

10. An alkaline cell comprising the zinc alloy powder according to claim 3 as an anode active material.

11. An alkaline cell comprising the zinc alloy powder according to claim 4 as an anode active material.

12. An alkaline cell comprising the zinc alloy powder according to claim 5 as an anode active material.

13. An alkaline cell comprising the zinc alloy powder according to claim 6 as an anode active material.

* * * * *